United States Patent [19]

Kiryu

[11] Patent Number: 4,625,582

[45] Date of Patent: Dec. 2, 1986

[54] HARMONIC DRIVE APPARATUS

[75] Inventor: Yuichi Kiryu, Hyogo, Japan

[73] Assignee: S. Soga & Co., Tokyo, Japan

[21] Appl. No.: 684,585

[22] Filed: Dec. 21, 1984

[30] Foreign Application Priority Data

Dec. 29, 1983 [JP] Japan .................. 58-250254

[51] Int. Cl.$^4$ ............................. F16H 37/04
[52] U.S. Cl. ........................... 74/640; 74/805
[58] Field of Search ............ 74/640, 805, 804, 438, 74/411; 474/94

[56] References Cited

U.S. PATENT DOCUMENTS

| 2,906,143 | 9/1959 | Musser | 74/640 |
| 3,285,099 | 11/1966 | Parks, Jr. et al. | 74/640 |
| 3,435,706 | 4/1969 | Humphreys | 74/640 |
| 3,444,760 | 5/1969 | Claxton et al. | 74/640 |
| 3,667,320 | 6/1972 | Robinson | 74/640 |
| 4,393,727 | 7/1983 | Phillips | 74/411 X |
| 4,479,403 | 10/1984 | Marschner et al. | 74/640 |

FOREIGN PATENT DOCUMENTS 304375 7/1971 U.S.S.R. ................. 74/640

Primary Examiner—Kenneth J. Dorner
Assistant Examiner—Joseph M. Rolnicki
Attorney, Agent, or Firm—Wenderoth, Lind & Ponack

[57] ABSTRACT

A harmonic drive apparatus includes a circular spline having a number of internal teeth, a radially flexible cylindrical flexspline having outer spline teeth engageable with the internal teeth of the circular spline, and a wave generator disposed within the flexspline in engagement therewith. The circular spline, the flexspline, and the wave generator are rotatable around a rotational axis. The number of the external spline teeth of the flexspline is less than the number of the internal spline teeth of the circular spline. The wave generator has a cam section which generates a circumferential wave of radial deflection of the flexspline for causing the external spline teeth thereof to locally engage with the internal spline teeth of the circular spline. The cam section has elasticity in its radial direction sufficient for biasing the flexspline against the circular spline to absorb any play between the flexspline and the circular spline.

3 Claims, 7 Drawing Figures

HARMONIC DRIVE APPARATUS

BACKGROUND OF THE INVENTION

The present invention relates to a harmonic drive apparatus, and more particularly, to an improvement for strengthening and stabilizing the tooth engagement of a circular spline with a flexspline disposed within the circular spline.

In a conventional harmonic drive apparatus, such as that disclosed in U.S. Pat. No. 3,667,320, a generally elliptical wave generator is rotated by its driving shaft rotating at a high speed to rotate and deform an elliptical flexspline outside the wave generator through a bearing disposed between the wave generator and the flexspline. The flexspline has a number of external spline teeth, and a circular spline disposed outside the flexspline also has a number of internal spline teeth for locally engaging with the flexspline teeth, with the number of flexspline teeth being less than the number of circular spline teeth. The tooth engaging positions of the flexspline and the circular spline are moved in conformity with the rotation of the driving shaft. Due to the difference between the number of flexspline teeth and the number of circular spline teeth, the flexspline is rotated at a rate corresponding to the difference in the direction opposite the rotational direction of the driving shaft since the circular spline is secured to a casing of the apparatus. An output shaft connected to the flexspline on the low speed side of the apparatus is thereby rotated.

In the above conventional apparatus, the wave generator is a rigid body and the engaging states of teeth depend on only the finishing accuracy of the wave generator. Namely, when the elliptical wave generator has a length in the direction of the major axis thereof longer than a predetermined length, the bearing is excessively pressed by the wave generator and the endurance of the bearing is reduced, thereby preventing the normal movement of the bearing. On the other hand, when the wave generator has a length in the direction of its major axis shorter than a predetermined length, the flexspline teeth loosely engage with the circular spline teeth, and the accuracy of the operation of the harmonic drive apparatus is reduced. Furthermore, the apparatus portions are inevitably slightly worn away during their use for a long period, which also reduces the accuracy of their operations.

SUMMARY OF THE INVENTION

Accordingly, an object of the present invention is to provide a harmonic drive apparatus in which a flexspline is biased against a circular spline at all times so as to locally engage external teeth of the flexspline with internal teeth of the circular spline, thereby maintaining the preferable engaging state of teeth at all times.

With the above object in view, the present invention resides in a harmonic drive apparatus comprising a rigid, circular spline which has a number of internal spline teeth and which is rotatable about an axis of rotation, a hollow, cylindrical, radially deflectable flexspline having outer spline teeth engageable with said internal spline teeth of said circular spline, said flexspline being concentrically rotatable about said axis of rotation, and the number of said external spline teeth of said flexspline being less than the number of said internal spline teeth of said circular spline, and a wave generator disposed within said flexspline in engagement therewith and rotatable about said axis of rotation, said wave generator having a cam section which generates a circumferential wave of radial deflection of said flexspline for causing the external spline teeth of said flexspline to locally engage with the internal spline teeth of said circular spline, said section having an elasticity in the radial direction sufficient for biasing said flexspline against said circular spline to absorb any play between said flexspline and said circular spline.

BRIEF DESCRIPTION OF THE DRAWINGS

Other objects and advantages of the present invention will become apparent from the following detailed description, taken in conjunction with the accompanying drawings.

DESCRIPTION OF THE PREFERRED EMBODIMENTS

Figure 1:
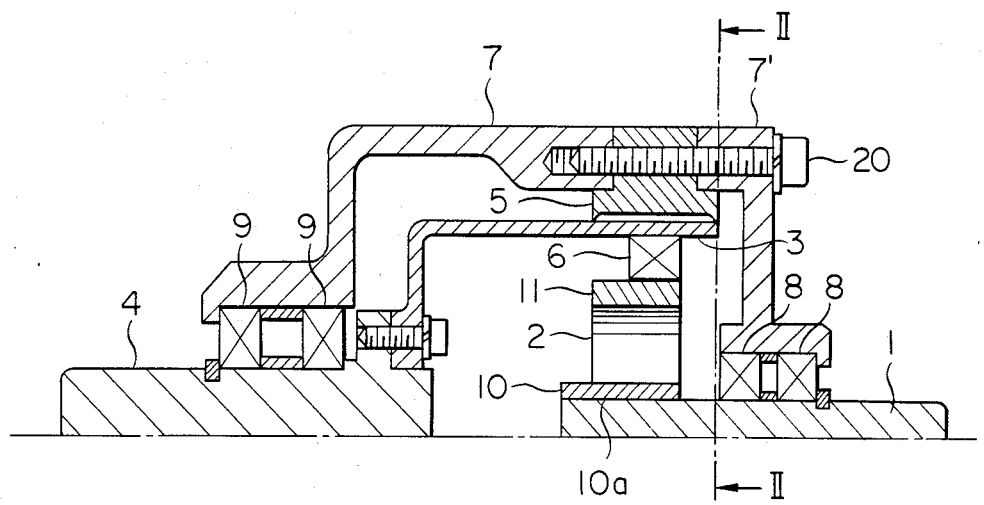
FIG. 1 is a sectional side view of the upper half of a harmonic drive apparatus according to the present invention.
Figure 2:
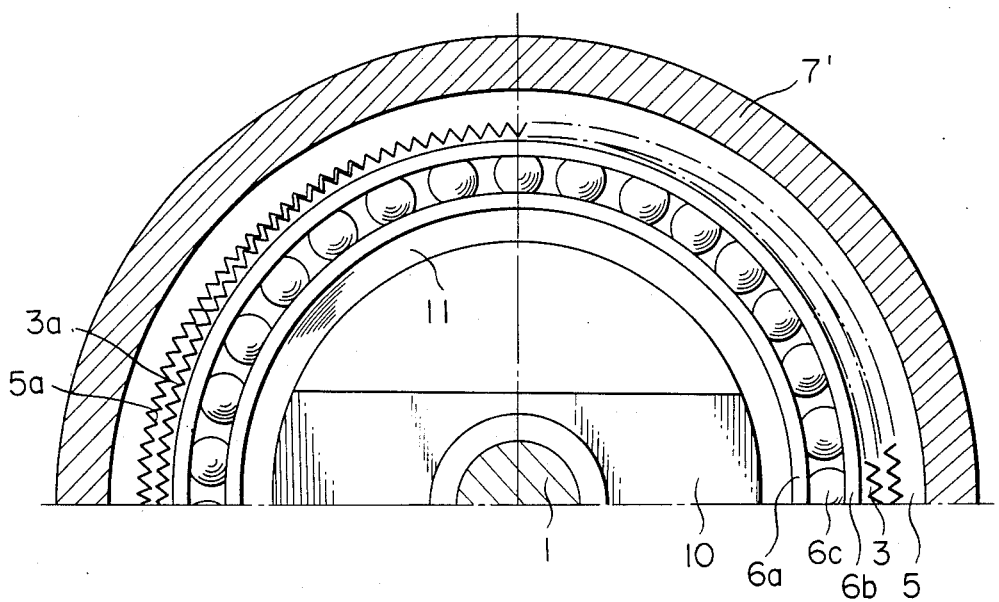
FIG. 2 is a sectional view of the harmonic drive apparatus taken along Line II—II of FIG. 1.
Figure 3:
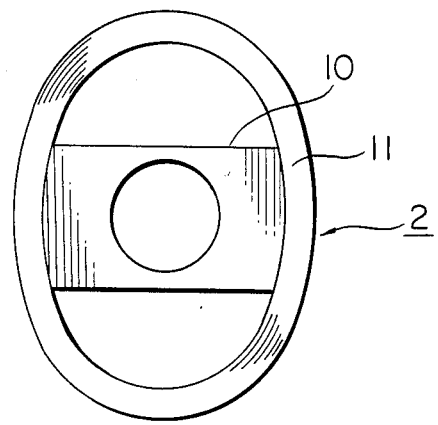
FIG. 3 is a front view of a wave generator in the harmonic drive apparatus of FIG. 1.

Referring to FIG. 1, a harmonic drive apparatus of the present invention is shown which comprises a driving shaft 1 rotatable at a high speed, and a wave generator 2 secured on the driving shaft 1. The wave generator 2 is preferably made of steel, etc., and has a boss 10 with a bore 10a for securing the boss 10 onto the driving shaft 1, and a ring member 11 which is elliptical having a major and a minor axis in the illustrated embodiment and is elastic in the radial direction thereof. A bearing 6 is disposed between the wave generator 2 and a flexspline 3 to rotate the flexspline 3 by the rotation of the wave generator 2. The bearing 6 comprises inner and outer cylindrical races 6a and 6b both flexible in the radial directions thereof, and balls 6c rotatably retained between the inner and outer races. A circular spline 5 is disposed outside the flexspline 3 and secured by a fastening member 20 to casings 7' and 7 which are rotatable around the driving shaft 1 which is connected to the flexspline 3 through bearings, and around a shaft 4 on the low speed side fixed to the flexspline 3 through bearings 9. The flexspline 3 and the circular spline 5 respectively have a number of external and internal spline teeth 3a and 5a as shown in FIG. 2, and the number of flexspline external teeth 3a is less than the number of internal teeth 5a of the circular spline 5. The flexspline external teeth 3a locally firmly engage with the internal teeth 5a of the circular spline 5 when the flexspline 3 is deflected radially outwards by the compression of the wave generator 2. The boss 10 of the wave generator 2 is located on the interior of the wave generator 2 and is preferably made of steel, aluminum, or spring steel, and the ring member 11 is preferably made of spring steel. The boss 10 and the ring member 11 may be integrally formed. The boss 10 within the elliptical ring member 11 is secured to the ring member 11 so as to be parallel with the minor axis thereof, and the upper and lower portions of the ring member 11 are elastic in the direction of the major axis thereof and thus constitutes a cam section for locally engaging the flexspline external teeth 3a with the circular pulse internal teeth 5a to absorb any play between the flexspline 3 and the circular spline 5.

When the wave generator 2 is secured to the shaft 1 and assembled within the flexspline 3 so as to bias the wave generator 2 against the flexspline 3, the upper and lower portions of the ring member 11 are compressed and deformed within the flexspline 3 and thereby apply a compression force on the flexspline 3 from the inside thereof through the bearing 6 in the direction of the major axis of the ring member 11, thereby maintaining the reliable engaging state of teeth at all times.

Figure 4:
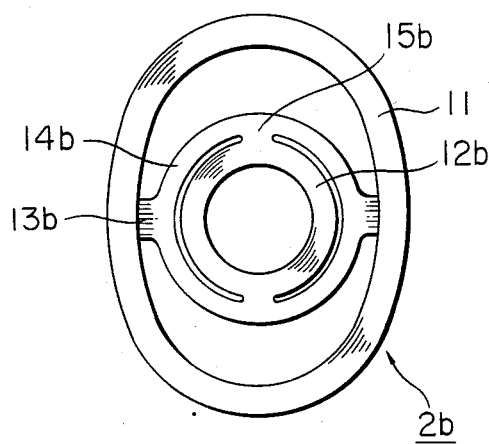
FIGS. 4 to 7 are front views of other embodiments of the wave generator according to the present invention.

FIG. 4 shows another embodiment of the wave generator according to the present invention. The wave generator 2b comprises a boss 12b secured to the driving shaft 1, and elastic spring portions 14b connected to the boss 12b and the ring member 11 through bridge portions 15b and 13b in the major and minor axes of the ring member 11, respectively. The boss 12b and the spring portions 14b constitute an inner member. The wave generator 2b is also flexible in the radial direction thereof but rigid in the circumferential direction, which is useful to absorb the disagreement between the axes of the driving shaft 1 and the circular spline 5.

Figure 5:
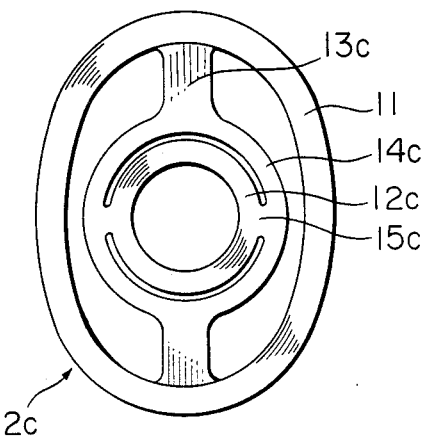

In FIG. 5, the wave generator 2c comprises a boss 12c similar to the boss 12b, and elastic spring portions 14c connected to the boss 12c and the ring member 11 through bridge portions 15c and 13c in the minor and major axes of the ring member 11, respectively. The wave generator 2c with bridge portions 13c in the major axis direction has a rigidity against the torsion which inevitably occurs in the wave generator, the torsional rigidity being higher than the torsional rigidity of the wave generator 2b with bridge portions 13b in the minor axis direction in FIG. 5. This torsion of the wave generator is generated because the wave generator portions are slightly displaced in the circumferential direction by the rotation of the driving shaft 1 so that the engaging positions of teeth against the driving shaft 1 are slightly retracted from their normal positions in proportion to the torque of the driving shaft.

Figure 6:
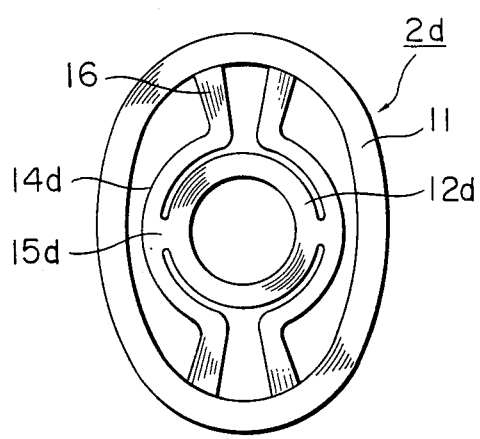

FIG. 6 shows a further embodiment of the wave generator to reduce the torsion thereof described above. A wave generator 2d comprises a boss 12d similar to the boss 12c, elastic spring portions 14d connected to the boss 12d through bridge portions 15d, preferably four levers 16 connected to the spring portions 14d, and an elastic ring member 11. The levers 16 are fixed to the ring member 11 at each end thereof in the radial direction of the ring member 11 in generally parallel pairs on opposite sides of the major axis, at which the teeth of the flexspline 3 generally begin to locally completely engage with the teeth of the circular spline 5. When the torque is transmitted from the driving shaft 1 to the wave generator 2d, the spring portions 14d apply forces on the levers 16 through the bridge portions 15d.

In FIG. 6, when torque is applied to the wave generator 2d in the clockwise direction, the right lever of the two upper levers 16 applies the torque on the ring member 11 in the counterclockwise direction, thereby generating a slight displacement of the ring member 11 in the counterclockwise direction which acts to advance the engaging positions of teeth in the clockwise direction. When the advancement distances of the engaging positions and the aforementioned retraction distances thereof described with respect to FIG. 5 are balanced, it is possible to maintain the rigidity of the harmonic drive portions on the side of the driving shaft rotating at a high speed at an extremely high level.

Figure 7:
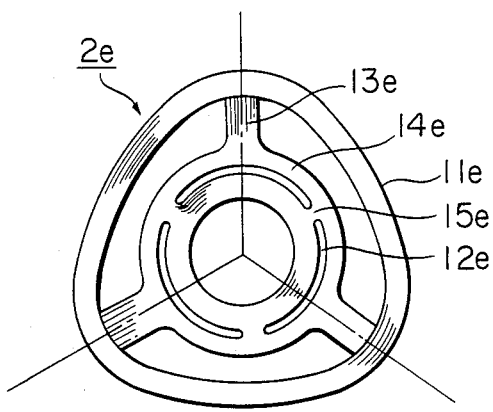

FIG. 7 shows another embodiment of the wave generator used in a harmonic drive apparatus in which the teeth of the flexspline 3 locally engage with the teeth of the circular spline 5 at angles equally spaced by 120°. The wave generator 2e comprises a boss 12e similar to bosses 12b, 12c and 12d, elastic spring portions 14e connected to the boss 12e through bridge portions 15e, a ring member 11e with three rounded corners equally spaced by 120°, and three bridge portions 13e respectively connected to the spring portions 14e and the three rounded corners of the ring member 11e. It will be understood that the wave generator 2e also has a function similar to the one of the wave generator 2c described with respect to FIG. 5.

As mentioned above, according to the present invention, the outermost portion of a wave generator is constituted by an elastic ring member flexible in the radial direction but rigid in the circumferential direction. The ring member is preferably generally in the shape of an ellipse and has a uniform cross section along its length, and is processed in a manner such that the length of the major axis of the ring member is slightly longer than a predetermined length in an unrestricted state. Accordingly, when the ring member is assembled within a flexspline such that the length of the major axis of the ring member is reduced to the predetermined length by compressing the wave generator, the ring member applies a compressive force on the flexspline from the inside thereof so as to locally reliably engage the external teeth of the flexspline with the internal teeth of a circular spline at all times. Thus, even when there is an error in the length of the major axis of the wave generator in manufacturing it or if the major axis of the wave generator is reduced in length by wear during its usage, such an error or reduction causes the engaging force between the flexspline and the circular spline to change only a little without preventing them from functioning so that a stable engaging state can be maintained at all times. Furthermore, although in the conventional harmonic drive apparatus, the elliptical wave generator comes in point contact with the circular spline, according to the present invention, the wave generator comes in line contact with the circular spline over some distance by the flexure of the flexible wave generator, thereby slightly increasing the number of efficiently engaging teeth, which is an outstanding effect.

What is claimed is:

1. A harmonic drive apparatus comprising:

a rigid, circular spline which has a number of internal spline teeth and which is rotatable about an axis of rotation;

a hollow cylindrical, radially deflectable flexspline having outer spline teeth engageable with said internal spline teeth of said circular spline, said flexspline being concentrically rotatable about said axis of rotation, and the number of said external spline teeth of said flexspline being less than the number of said internal spline teeth of said circular spline; and a wave generator disposed within said flexspline in engagement therewith and rotatable about said axis of rotation, said wave generator having a cam section which generates a circumferential wave of radial deflection of said flexspline for causing the external spline teeth of said flexspline to locally engage with the internal spline teeth of said circular spline, said cam section having an elasticity in its radial direction sufficient for biasing said flexspline against said circular spline to absorb any play between said flexspline and said circular spline, said wave generator including a ring member elliptical in cross section, flexible in its radial direction, and having rigidity in its circumferential direction, and an inner member, disposed within said ring member, which is flexible in the radial direction of said ring member so as to apply a compressive force on said ring member from the inside thereof, said inner member being connected to the ring member in the direction of the minor axis thereof.

2. A harmonic drive apparatus comprising:
a rigid, circular spline which has a number of internal spline teeth and which is rotatable about an axis of rotation;
a hollow cylindrical, radially deflectable flexspline having outer spline teeth engageable with said internal spline teeth of said circular spline, said flexspline being concentrically rotatable about said axis of rotation, and the number of said external spline teeth of said flexspline being less than the number of said internal spline teeth of said circular spline; and
a wave generator disposed within said flexspline in engagement therewith and rotatable about said axis of rotation, said wave generator having a cam section which generates a circumferential wave of radial deflection of said flexspline for causing the external spline teeth of said flexspline to locally engage with the internal spline teeth of said circular spline, said cam section having an elasticity in its radial direction sufficient for biasing said flexspline against said circular spline to absorb any play between said flexspline and said circular spline, said wave generator including a ring member elliptical in cross section, flexible in its radial direction, and having rigidity in its circumferential direction, and an inner member, disposed within the ring member, which is flexible in the radial direction of the ring member so as to apply a compressive force on the ring member from the inside thereof, said inner member including concentric elastic spring portions inside said ring member, connected to each other in the direction of the minor axis of said ring member, and to said ring member in the direction of the major axis thereof, through bridge portions so as to transmit the torque from said spring portions to said ring member.

3. A harmonic drive apparatus comprising:
a rigid, circular spline which has a number of internal spline teeth and which is rotatable about an axis of rotation;
a hollow cylindrical, radially deflectable flexspline having outer spline teeth engageable with said internal spline teeth of said circular spline, said flexspline being concentrically rotatable about said axis of rotation, and the number of said external spline teeth of said flexspline being less than the number of said internal spline teeth of said circular spline; and
a wave generator disposed within said flexspline in engagement therewith and rotatable about said axis of rotation, said wave generator having a cam section which generates a circumferential wave of radial deflection of said flexspline for causing the external spline teeth of said flexspline to locally engage with the internal spline teeth of said circular spline, said cam section having an elasticity in its radial direction sufficient for biasing said flexspline against said circular spline to absorb any play between said flexspline and said circular spline, said wave generator including a ring member elliptical in cross section, flexible in its radial direction, and having rigidity in its circumferential direction, and an inner member, disposed within said ring member, which is flexible in the radial direction of said ring member so as to apply a compressive force on said ring member from the inside thereof, said inner member including bridge portions, concentric elastic spring portions inside said ring member, and first and second pairs of generally parallel levers generally parallel to and disposed on opposite sides of the major axis of said ring member, said levers connecting said ring member with said elastic spring portions so as to transmit torque from said spring portions to said ring member through said levers, said spring portions being connected to each other in the direction of the minor axis of said ring member through said bridge portions.

* * * * *